Patented June 23, 1925.

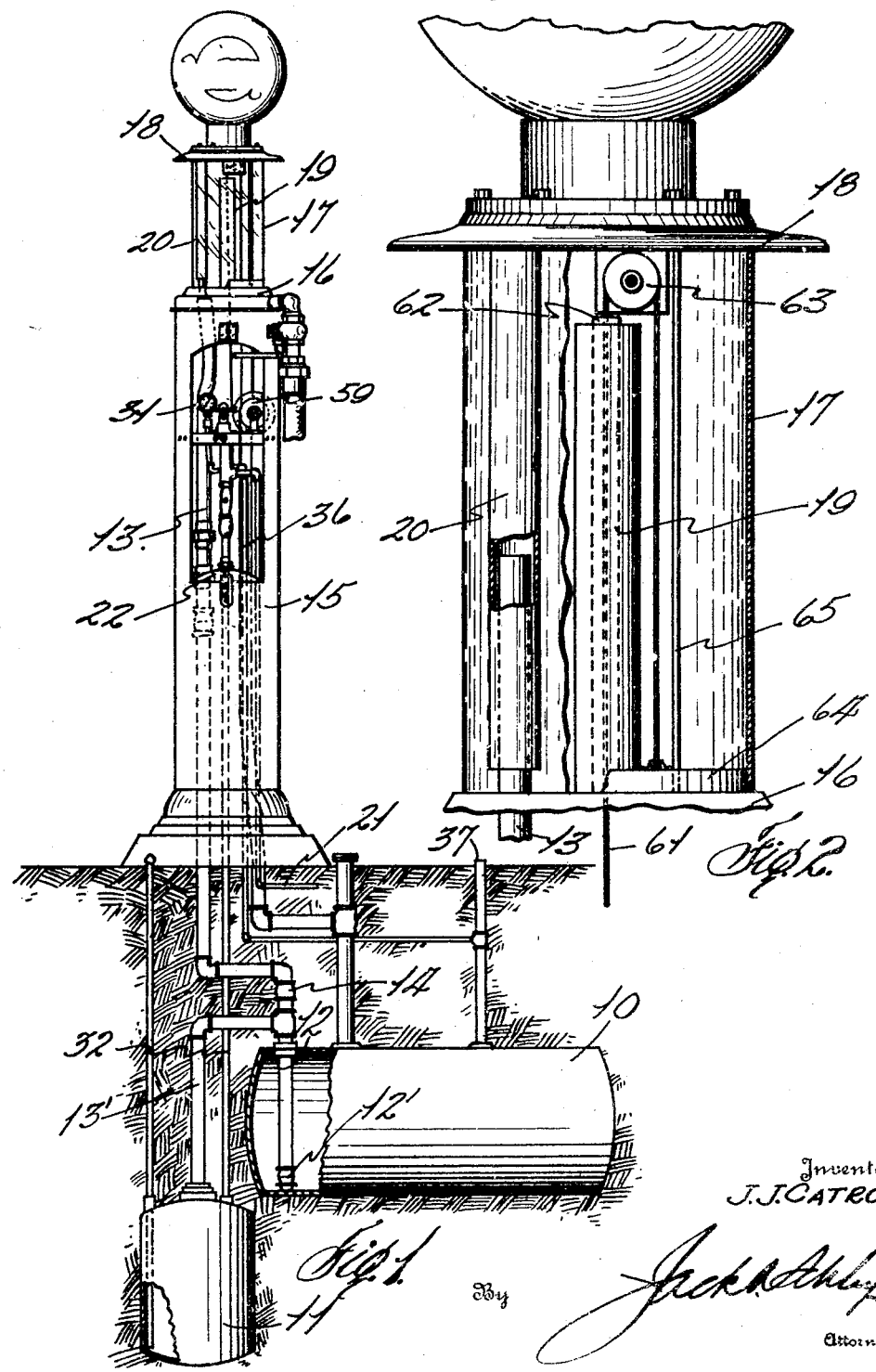

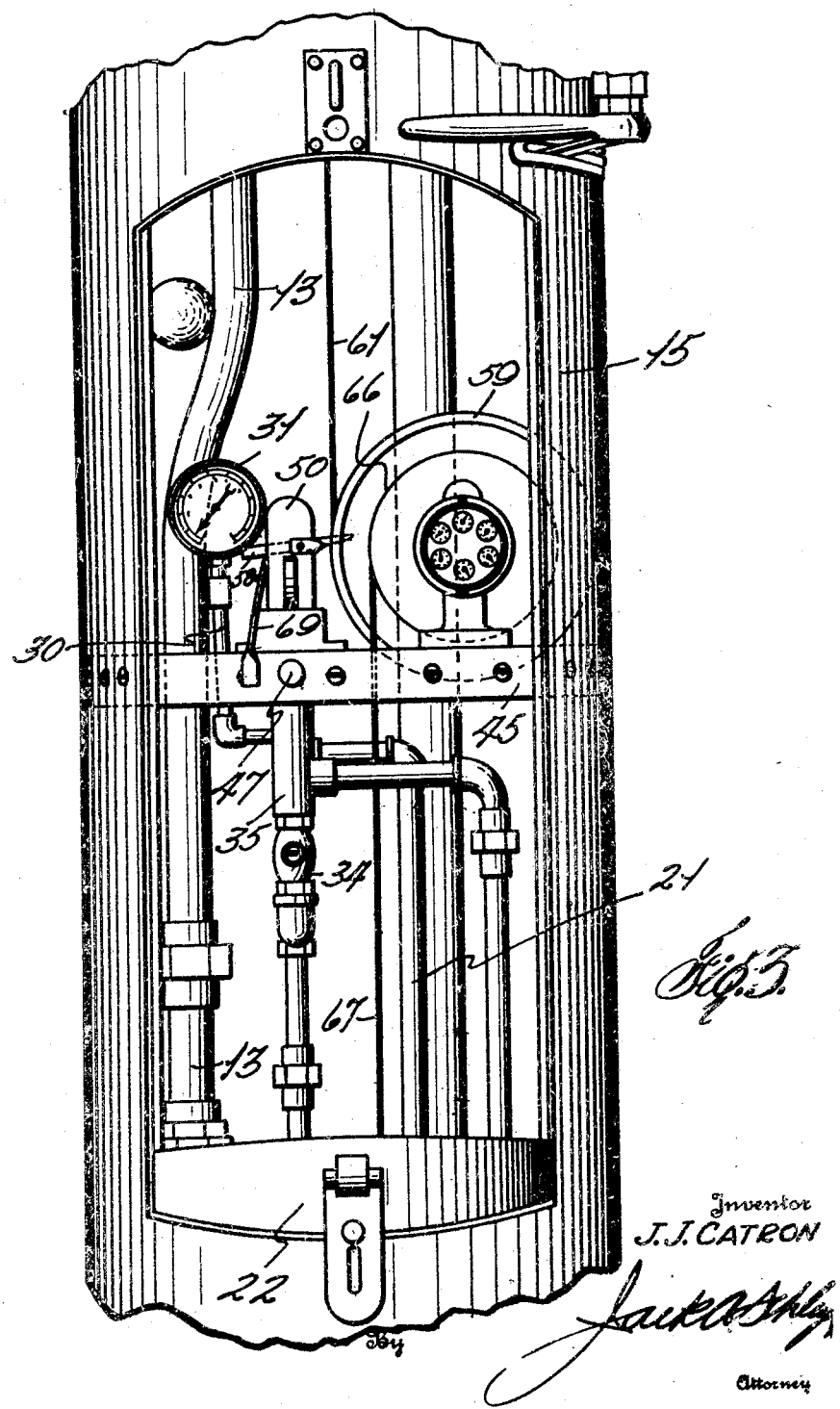

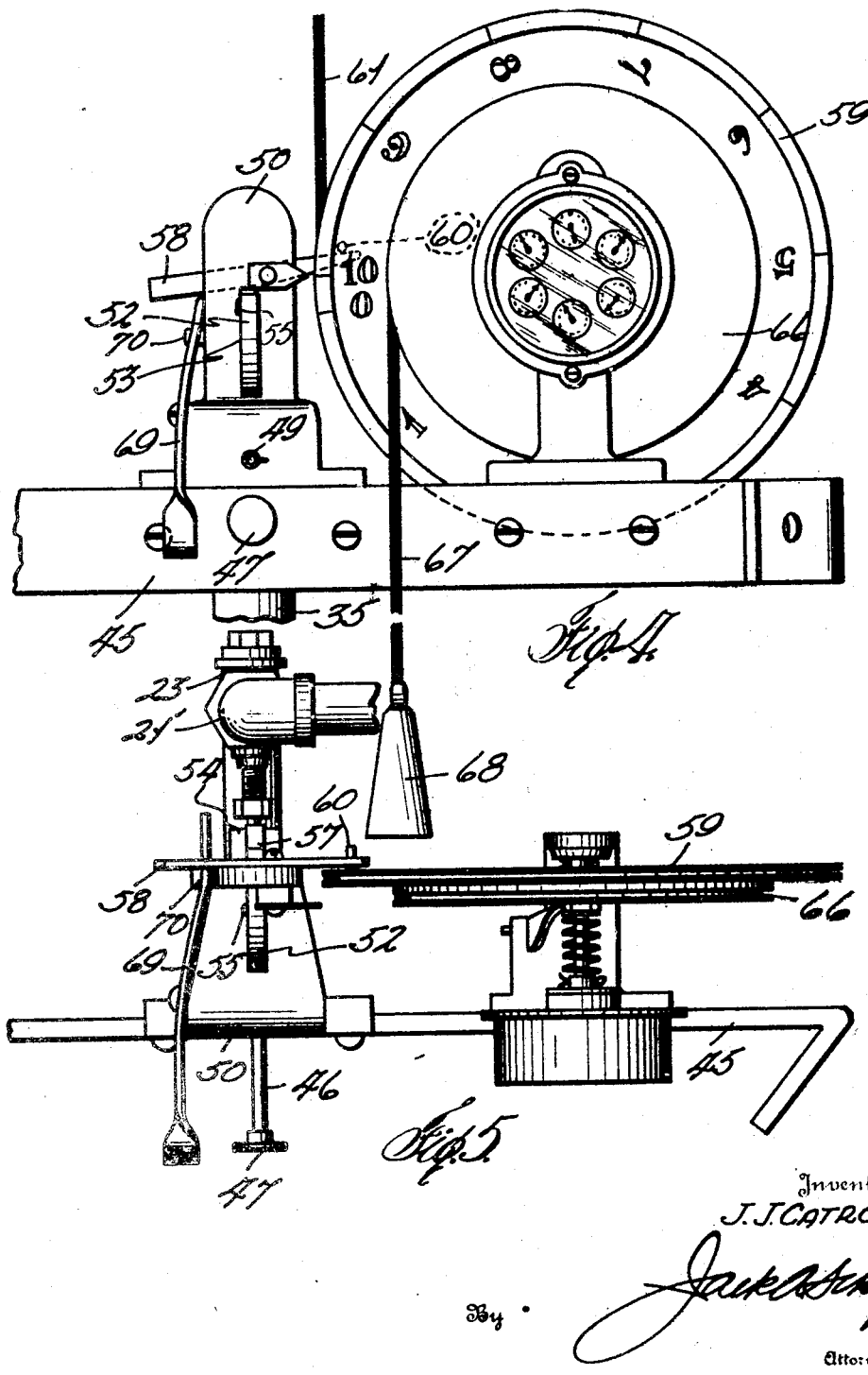

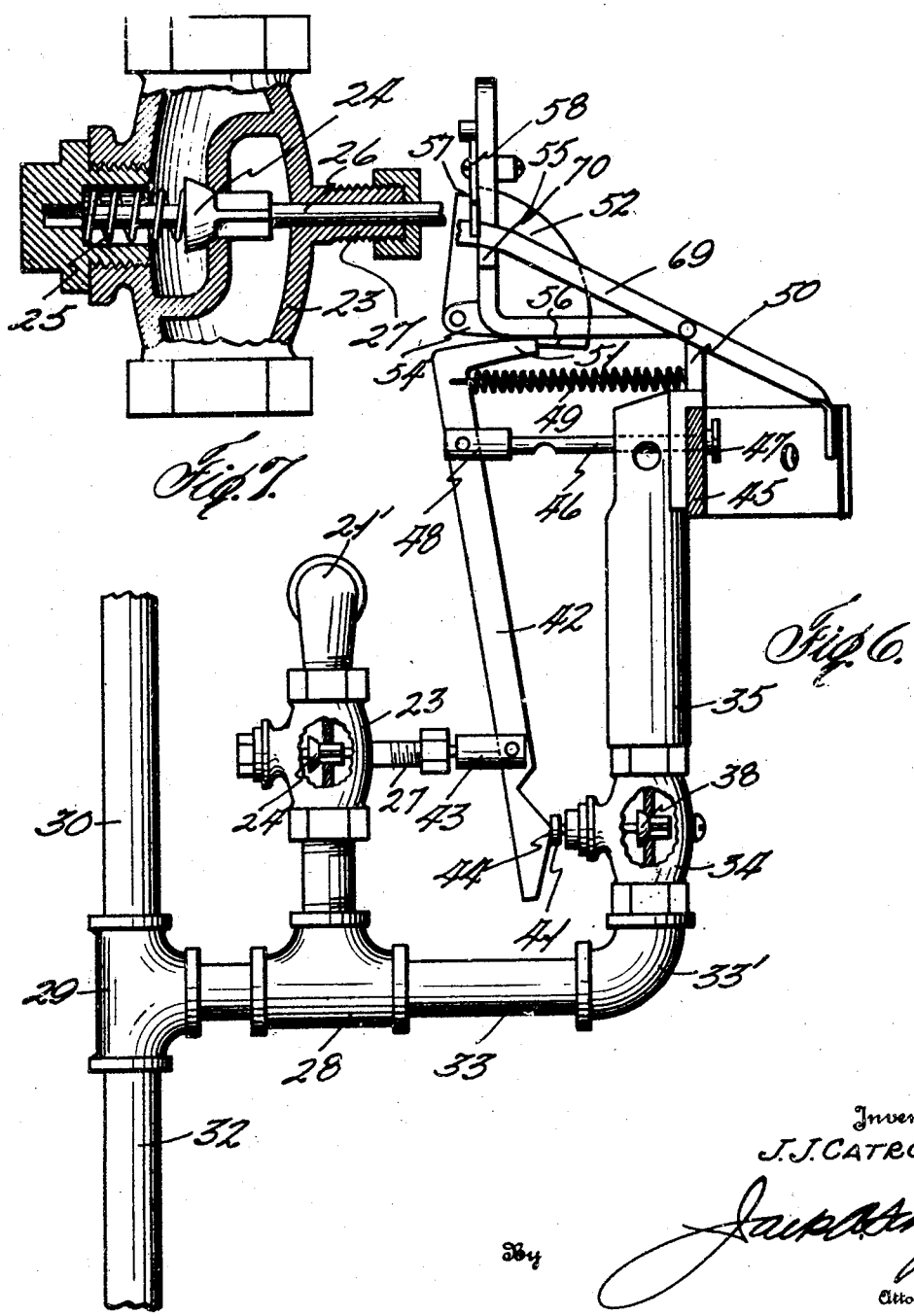

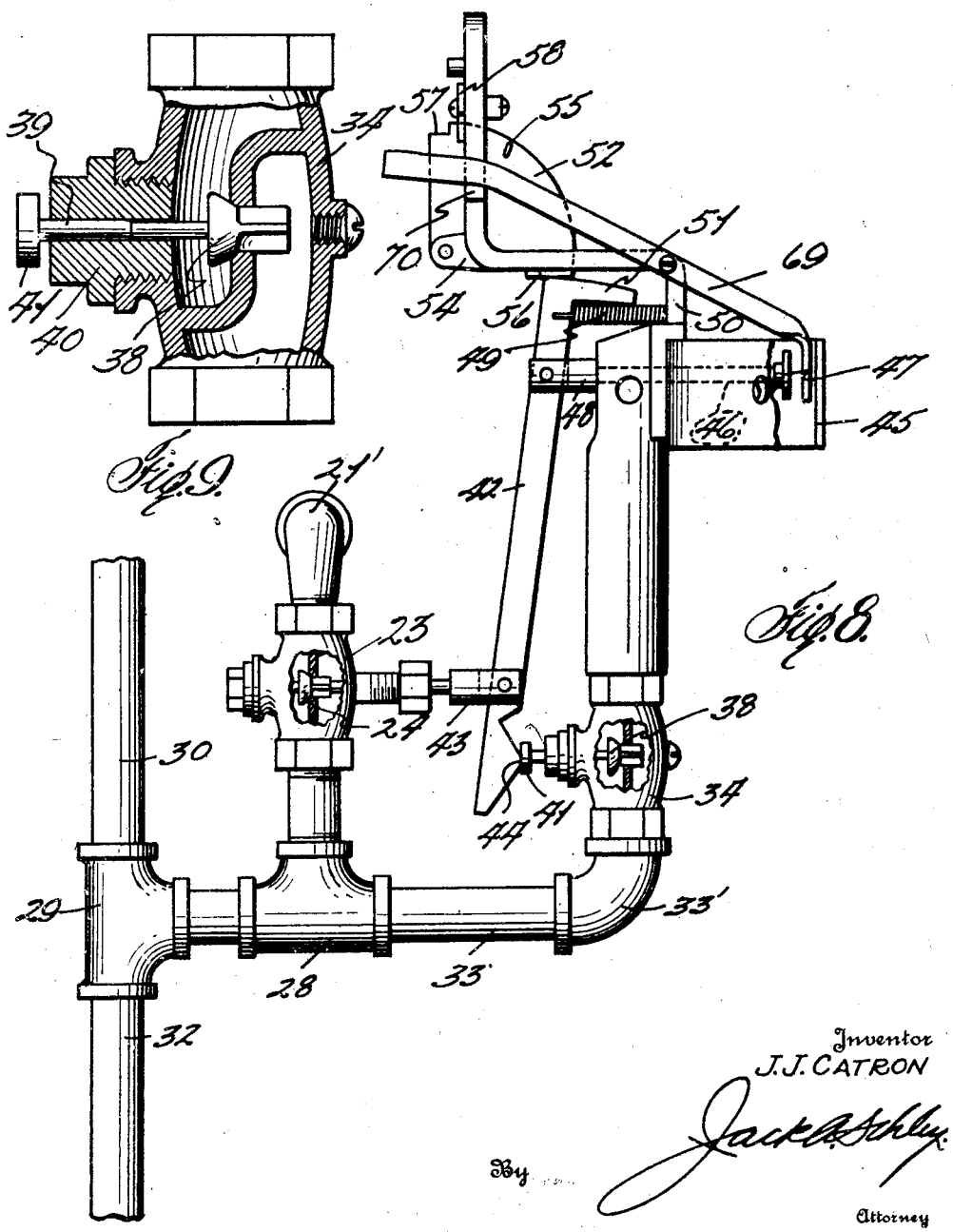

1,543,204

UNITED STATES PATENT OFFICE.

JOHN J. CATRON, OF BONHAM, TEXAS, ASSIGNOR TO CATRON MANUFACTURING COMPANY, OF BONHAM, TEXAS, A CORPORATION OF TEXAS.

FLUID-DISPENSER-SUPPLY CONTROL.

Application filed September 1, 1923. Serial No. 660,480.

*To all whom it may concern:*

Be it known that I, JOHN J. CATRON, a citizen of the United States of America, residing at Bonham, in the county of Fannin and State of Texas, have invented certain new and useful Improvements in Fluid-Dispenser-Supply Controls, of which the following is a specification.

This invention relates to new and useful improvements in fluid dispenser supply controls.

The object of the invention is to provide means operated either automatically or manually for controlling the means of supply to a visible fluid dispensing receptacle, whereby the means of supply to the receptacle may be manually stopped before receptacle is filled or whereby the means of supply will be automatically cut off when the receptacle is filled.

A particular object of the invention is to provide a movable measuring element controlled by a float in the measuring receptacle and associated with a tripping device for automatically operating the latter, whereby the means of supply of fluid to the receptacle is cut off.

Another object of my invention is to provide a simple device for operating the air supply and air release in sequence.

A further object is to provide a single operating means of an improved type for controlling both the air supply and air release.

Another object of the invention is to operate the air supply valve and the air release valve in successive order by means of a common operating member, disposed therebetween.

A still further object is to provide a tripping release connection for the common operating member arranged to release said member at a predetermined point, whereby the air supply valve is held open until said member is released.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of a fluid dispenser having a supply control constructed in accordance with my invention, Fig. 2 is an enlarged view of the visible measuring receptacle and a portion of the tripping means, Fig. 3 is an enlarged view of the controlling means and component parts, Fig. 4 is an enlarged front elevation of the tripping wheel and tripping means, Fig. 5 is a plan view of the same with the valve control added, Fig. 6 is a side elevation of the valve controlling means, the valves being partially in section and the air supply valve being open and the air release valve closed.

Fig. 7 is an enlarged sectional view of the air supply valve,

Fig. 8 is a view similar to Fig. 6, but with the air supply valve closed and the air release valve open, and Fig. 9 is an enlarged sectional view of the air release valve.

In the drawings the numeral 10 designates an underground storage tank and 11 a pressure tank. A liquid supply pipe 12 leads from the tank 10 and is connected by a branch pipe 13' with the pressure tank, the latter being below the tank 10 and syphoning the liquid therefrom. The supply pipe has a check valve 12' at its lower end in the tank 10 and another check valve 14 just above the connection with the branch pipe 13'. The supply pipe 13 extends up through a cabinet 15 to the base 16 of a visible measuring receptacle which includes a glass cylinder 17 and a cap 18. An overflow pipe 19 leads from a point in the receptacle down through the cabinet to the tank 10. The upper end of the supply pipe terminates in a sleeve 20 (Fig. 2) open in the receptacle at its lower end, whereby the fluid flows into the receptacle, free from bubbles and excessive agitation.

Compressed air is supplied from a suitable source by means of a pipe 21 which extends up through the cabinet 15 and the invention has particularly to do with means for controlling the supply of this air to the pressure tank 11. One of the features of the invention is to maintain the storage tank 10 free from the pressure of the air. The pipe 21 is turned laterally in the upper portion of the cabinet. At this portion the cabinet has a slidable door 22, which when opened gives access to the mechanism within. The lateral extension of the pipe 21, is connected by an elbow 21' (Figs. 5, 6 and 8) with an air supply valve 23. As is shown in detail in Fig. 7, this valve has a valve head 24 held to its seat by a coiled spring 25 and having its stem 26 extending through a guide nipple 27 on the valve casing. The spring holds the valve normally seated.

The valve 23 is connected with a horizontal T 28 which is connected with a vertical T 29. A gauge pipe 30 extends upwardly from the T 29 and has an air pressure gauge 31 at its upper end (Figs. 1 and 3). An air supply pipe 32, forming a continuation of the pipe 21 leads down the cabinet from the T 29 and enters the tank 11. This pipe supplies compressed air to elevate the liquid through the pipes 13 and 13' to the cylinder 17.

It is obvious that whenever the valve 23 was closed, after being operated, there would remain suspended in the pipe 13, the liquid which had not been discharged into the cylinder 17 and also there would be a pressure of air in the tank 11. In order to relieve this pressure, the trapped air is released. For this purpose a short pipe 33 extends forwardly from the T 28 and is connected by an elbow 33' with an air release valve 34. A casting 35 having an elbow at its lower end is connected with the valve. A release pipe 36 suitably directed, leads from the casting down through the cabinet to an upright vent pipe 37 extending from the storage tank 10.

The air release valve as is shown in detail in Fig. 9, includes a valve head 38 and a stem 39 extending through a cap 40 and carrying a button 41 on its outer end. The valves 23 and 34 are disposed with their stems 26 and 39 directed toward each other and the stem 26 a short distance above the stem 39. When the air supply valve 23 is closed the air unseats the valve head 38 and escapes from the pipe 32.

It is one of the objects of this invention to provide means for operating the valves in common, so that the operator is required to use only one hand for the purpose. In carrying out this feature means are provided for operating the valves in tandem and includes an upright lever 42 pivoted above its lower end in a head 43 mounted on the outer end of the stem 26. The lower edge of the lever has a fulcrum boss 44 shaped with an apex to ride on the button 41.

The casting 35 is secured to a transverse supporting bar 45 which has its ends bent and fastened in the cabinet. The elbow of the pipe 36 is included in this casting merely as a matter of convenience. A plunger 46 is slidably mounted in the bar and casting, and has a button 47 on its forward end in front of the bar. On its rear end the plunger has a head 48 in which the upper portion of the lever 42 is pivoted. A coiled spring 49 has one end attached to the lever above the head 48 and its other end connected with a bracket 50 mounted on the casting. When the plunger is pressed inward by means of the button 47 the spring 49 is placed under tension, so that when the plunger is released the spring returns the lever.

When the plunger 46 is depressed, the coiled spring 25 is under tension, and the spring 49 is substantially relaxed during the first portion of the movement. This causes the lever 42 to swing in the head 43 and the boss 44 to engage the button 41 and seat the valve head 38 before the stem 26 is depressed. By this arrangement the release valve is closed during the initial movement of the lever and prior to the opening of the air supply valve 23. A continued movement of the plunger causes the boss 44 to fulcrum upon the button 41 whereby the lever changes its fulcrum point and depresses the stem 26, which unseats the head 24, thus permitting air to pass to the pipe 32.

In order that the operator need not hold the plunger depressed while the measuring receptacle is filling, a finger 51 is mounted on the upper end of the lever. This finger is directed forwardly and rides under a quadrant latch 52 swinging in a slot 53 in the bracket and pivoted between ears 54 on the rear of the bracket. The upward and rearward swinging movement of the quadrant is limited by a pin 55. The quadrant has a lug 56 on its bottom and this rests upon the finger. When the lever is swung rearwardly to open the air supply valve 23 the finger rides under the lug and finally passes the same which latter drops in front of the finger.

On the upper rear end of the quadrant a shoulder 57 is cut to receive a latch bar 58 pivoted on the rear side of the bracket. When the lug drops in front of the finger 51 the latch bar drops behind the shoulder 57 and locks the lever in the "open" position as shown in Fig. 6. The upper surface of the finger is rounded and the rear edge of the lug is bevelled. When the lever 42 is swung the spring 49 is placed under tension and whenever the latch bar is lifted, the finger impelled by said spring, will displace the quadrant upwardly, leaving the lever 42 free to return, so that the spring 25 may close the air supply valve 23. For tripping the latch bar 58 two means are shown, but it is to be understood various means for locking the lever as well as numerous means for tripping may be evolved and the invention is not to be limited to the means shown and described.

An indicating wheel 59 is mounted to the right (Figs. 4 and 5) of the latch bar 58 and has a pin 60 on its rear side. This wheel has one end of a flexible connection 61 wound thereon. This connection 61 passes up through the base 16 and through a tube 62 therein to a pulley 63 suspended in the top of the measuring receptacle (Fig. 2). The connection 61 passes over the pulley and down to a float 64 slidable in the cylinder 17 on a vertical guide rod 65. The wheel 59 has a grooved drum 66 concentrically mounted on its face and a flexible connection 67 hanging from the same side as the connection 61. A counter-weight 68 is attached to the connection 67 and acts to counter-balance the float 64 and by unwinding from the drum 66, when said float is elevated, rotates said wheel in a counter clock-wise direction, whereby the connection 61 is moved thereon.

When the float approaches the top of the cylinder the pin 60 approaches the end of the bar 58 and as the float finishes its upward movement the pin depresses the latch bar which is lifted from the shoulder 57 and the quadrant 52 is thus released. Thus when the cylinder is filled to the required level the supply valve is closed. In case it is desired to trip the bar 58 when the cylinder has been partially filled, a finger lever 69 is depressed. This lever is pivoted on the side of the bracket 50 and has its forward end turned down near the button 47; while its rear end rests on a lug 70 extending from the side of the bracket. The quadrant is between the pivot of the latch bar 58 and the lever 69. When the said lever is depressed its rear end is elevated and engages the bar 58 and swings the same from the shoulder 57, whereby the quadrant is released.

In operating the dispenser the operator places his thumb on the button 47 with the parts in the position shown in Fig. 8. In this position the air supply valve 23 is closed and the air release valve 34 is open. The operator depresses the plunger 46 which swings the lever 42. The spring 25 resists the initial movement of the lever and consequently the lever fulcrums in the head 43 of the valve 23 and springs 25 holds the valve head 24 seated. This causes the boss 44 to engage the button 41 and seat the valve head 38 of the release valve 34. After the valve 34 is closed the lever changes its fulcrum point to the boss 44 and the valve head 24 is unseated against the tension of the spring 25.

As the depression of the plunger is continued, the spring 49 is tensioned and the finger 51 rides under the lug 56 and comes to rest in the rear of the bevelled edge of the same. At the same time the bar 58 drops behind the shoulder 57 as is shown in Fig. 6. With the parts in this position the air supply valve is held open. The operator may remove his thumb from the button. Compressed air is conveyed by the pipe 32 to the tank 11 from which it elevates the liquid through the pipe 13 to the measuring receptacle, whereby the cylinder 17 is filled to the top of the overflow pipe 19. As the cylinder is filled the float 64 rises and the wheel 59 is rotated by the unwinding of the connection 67 therefrom.

Should it be desired to close the air valve and only partially fill the receptacle, the operator has merely to depress the finger lever, 69, which in turn swings the latch bar 58 upward from the shoulder 57 and releases the quadrant latch 52. Just as soon as the bar 58 is raised the tension of the spring 49 causes the finger 51 to ride off of the lug 56, which is displaced upward so that the bar 58 drops upon the arcuate edge of said quadrant. The spring 49 returns the lever 42 and plunger 46 to their normal positions. During the first part of the return movement the boss 44 fulcrums on the button 41 and the springs 25 and 49 both act, the former seating the valve 24. Just as soon as the valve head is seated, the fulcrum point changes to the head 43 and the pressure on the button 41 is relieved. This permits the compressed air which is trapped in the pipes 32 and 33 to unseat the valve head 38, whereby the air may escape through the pipes 36 and 37. If the finger lever 69 is not used the pin 61 will automatically engage the bar 58 and trip the quadrant 52.

It will be seen that many constructions could be worked out for operating the air release and air supply valves and the principal feature of the invention is the tripping mechanism for controlling the supply of fluid to the receptacle. It is obvious that the wheel and automatic could be used to operate the controlling means of any kind of liquid supply and is not to be limited to an air supply.

Various changes in the arrangement, location and size of the different elements as well as modifications and alterations may be made within the scope of the appended claims.

What I claim, is:

1. In a fluid dispenser control, the combination of a compressed air supply pipe, an air supply valve connected with the supply pipe, a trapped air release pipe, an air release valve connected with the air release pipe, and a common operating means for the valves fulcrumed to initially close the air release and subsequently to change its fulcrum point and open the air supply valve.

2. In a fluid dispenser control, the combination of a compressed air supply pipe, an air supply valve connected with the supply pipe, a trapped air release pipe, an air release valve connected with the air release pipe, a common operating means for the valves fulcrumed to initially close the air release and subsequently to change its fulcrum point and open the air supply valve and means for locking said operating means with the supply valve open.

3. In a fluid dispenser control, the combination of a compressed air supply pipe, an air supply valve connected with the supply pipe, a trapped air release pipe, an air release valve connected with the air release pipe, a common operating means for the valves fulcrumed to initally close the air release and subsequently to change its fulcrum point and open the air supply valve, means for locking said operating means with the supply valve open and means for tripping the locking means to release the common operating means.

4. In a fluid dispenser control, the combination of a compressed air supply pipe, an air supply valve connected with the supply pipe, a trapped air release pipe, an air release valve connected with the air release pipe, a common operating means for the valves fulcrumed to initially close the air release and subsequently to change its fulcrum point and open the air supply valve, means for locking said operating means with the supply valve open, means for tripping the locking means to release the common operating means, and means for returning the common operating means to its normal position when it is released to close the air supply valve and to open the air release valve.

5. In a fluid dispenser control, the combination of a compressed air supply pipe, an air supply valve connected to the supply pipe, a trapped air release pipe, an air release valve connected with the air release pipe, a lever disposed between the valves and pivoted to one valve and engaging with the other valve, and means for swinging the lever to close one valve and open the other valve.

6. In a fluid dispenser control, the combination of a compressed air supply pipe, a compressed air supply valve, a trapped air release pipe, an air release valve connected with said air release pipe, a lever mounted between valves and fulcrumed to the stem of the supply valve and having a fulcrum boss for engaging the stem of the release valve and means for actuating said lever.

7. In a fluid dispenser control, the combination of a compressed air supply pipe, a compressed air supply valve, a trapped air release pipe, an air release valve connected with said air release pipe, a lever mounted between valves and fulcrumed to the stem of the supply valve and having a fulcrum boss for engaging the stem of the release valve, a plunger for depressing the lever to open the supply valve, and a spring for returning the lever to close the supply valve.

8. In a fluid dispenser, the combination with a float operated tripping device, an air release valve, an air supply valve, a lever mounted to operate said valves in sequence, a plunger for swinging the lever, a coiled spring connected with the lever, a latch engaged by the lever, and a latch bar engaged by the latch and operated by the tripping device.

9. In a fluid dispenser, the combination with a float operated tripping device, an air release valve, an air supply valve, a lever mounted to operate said valves in sequence, a plunger for swinging the lever, a coiled spring connected with the lever, a latch engaged by the lever, a latch bar engaged by the latch and operated by the tripping device, and a hand release for operating the latch bar to free the latch.

10. In a fluid dispenser, the combination with a float operated tripping device, an air release valve, an air supply valve, a lever mounted to operate the said valves in sequence, a finger on the lever, a pivoted latch member engaged by the finger when the lever is swung, a plunger for swinging the lever, a coiled spring attached to the lever, and a latch bar engaged by the latch member and operated by the tripping device.

In testimony whereof I affix my signature.

JOHN J. CATRON.